E. J. OHNELL.
MEASURING INSTRUMENT.
APPLICATION FILED FEB. 8, 1917. RENEWED DEC. 27, 1918.

1,312,566.

Patented Aug. 12, 1919.
3 SHEETS—SHEET 1.

Inventor
E. J. Ohnell.
By his Attorney
T. F. Bourne

E. J. OHNELL.
MEASURING INSTRUMENT.
APPLICATION FILED FEB. 8, 1917. RENEWED DEC. 27, 1918.

1,312,566.

Patented Aug. 12, 1919.
3 SHEETS—SHEET 3.

Inventor
E. J. Ohnell.
By his Attorney
T. F. Bourne

UNITED STATES PATENT OFFICE.

ERNST J. OHNELL, OF BROOKLYN, NEW YORK.

MEASURING INSTRUMENT.

1,312,566.     Specification of Letters Patent.     Patented Aug. 12, 1919.

Application filed February 8, 1917, Serial No. 147,303. Renewed December 27, 1918. Serial No. 268,494.

*To all whom it may concern:*

Be it known that I, ERNST J. OHNELL, a citizen of the United States, and resident of New York city, borough of Brooklyn, in the county of Kings and State of New York, have invented certain new and useful Improvements in Measuring Instruments, of which the following is a specification.

In measuring instruments, such as weighing scales, having a lever or weighted arm provided with pivots supported upon movable members for rocking movements, there is liability that one or more of said members may be displaced from the proper position relatively to the pivot or pivots, which may be due to shocks or jars to which the instrument may be subjected. Where such movable members are supported for rocking movements upon knife edges, or carry knife edges for such purpose, said members, for proper operation, should be placed in definite relation to the pivots and to each other and should retain such relation to cause proper free rolling of the members under the pivots in all positions thereof. The object of my invention is to provide means to cause such members to remain in their proper relation to the pivots, under varying conditions of use, independently of any direct connection between the associate members, and to so balance such members that when they are moved by the rotation of the pivots of the corresponding lever or weighted arm thereon neither of such members will tend to resist the free rotation of such pivots, whereby to maintain the accuracy of the weighing mechanism and to cause the proper return of the indicating means or pointer to zero.

My invention comprises novel details of improvement and combinations of parts that will be more fully hereinafter set forth and then pointed out in the claims.

Reference is to be had to the accompanying drawings forming part hereof, wherein, Figure 1 is a front view of a portion of a scale mechanism embodying my invention;

Similar numerals of reference indicate corresponding parts in the several views.

Figure 1:
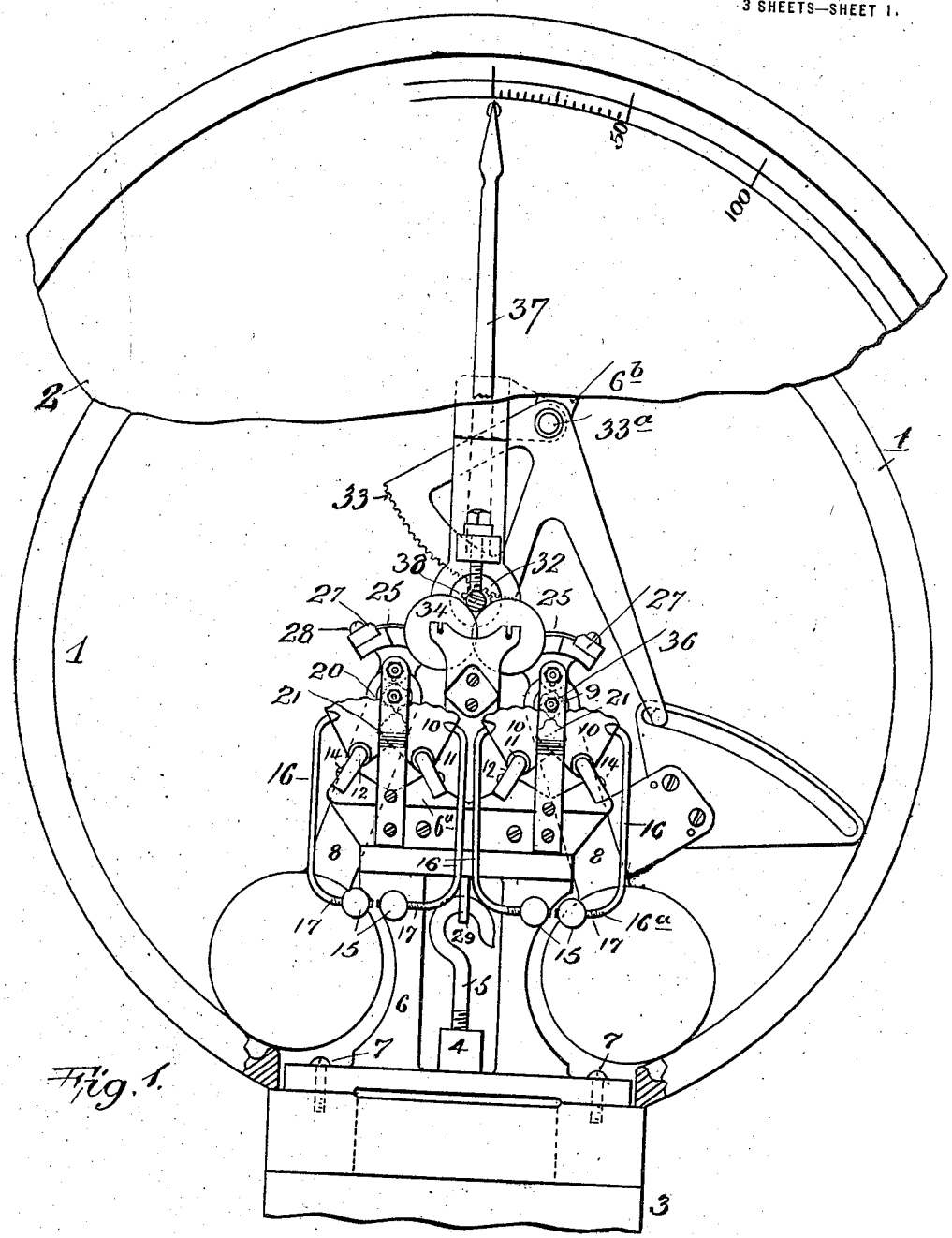

A suitable casing or frame is indicated at 1, and at 2 is indicated a suitable dial adapted to be supported on the casing in any desired manner. An upright or standard 3 is shown supporting the casing, which upright may be supported from a scale platform having weighing devices, such as equalizing levers, or in any other suitable manner, to be connected, as by a rod 4 having a hook 5, with the weighing devices hereinafter described. At 6 is indicated a frame of any suitable construction supported in casing 1, upon standard 3, in any suitable manner, as by screws 7. At 8 are indicated weighing levers or weighted arms supported by frame 6 and having, between their ends, pivots or gudgeons 9 projecting from opposite sides thereof. Since one or more levers 8 may be used in the scale mechanism to be supported and operated in the manner hereinafter described, a detailed description of one of such levers and devices coöperating therewith will be sufficient. The pivots or gudgeons 9 are respectively supported upon corresponding pairs of spaced movable members 10 which have correspondingly arranged upper working surfaces 10ᵃ upon which the corresponding working surfaces or peripheries of the pivots or gudgeons 9 rest, so that the latter may roll or rotate upon such corresponding pairs of members. The pairs of members 10 are shown located side by side, in lapped relation, on opposite sides of lever 8, and are separately supported to rock as influenced by the corresponding pivot 9. In the example illustrated, the members 10 are supported by knife edges, for which purpose the undersides of said members are shown provided with V-like or triangular recesses at 11 receiving knife edge supports 12, the edges of which are in the apices of the corresponding recesses of members 10, whereby the latter are supported to rock freely in a substantially frictionless manner. The knife edges are shown supported in recesses 13 in brackets or blocks 6ᵃ secured upon frame 6;

the knife edges being there secured by screws 14 passing through the knife edges and entering the brackets. As illustrated, the knife edges 12 are so located that planes passing through the apices or sharpened ends of the knife edges coincide at the axes of the pivots or gudgeons 9 of lever 8, the apices of the recesses 11 of the corresponding members 10 also lying in such corresponding planes. The weight of and that imposed upon lever 8 is thus transmitted to the corresponding members 10 and to the underlying knife edges along or in the direction of such planes, from the points on the peripheries of the pivots where they touch the peripheries of the corresponding members 10 in such planes, whereby direct thrusts of the weight are imposed through members 10 upon the knife edges in any position of said members. The members 10 are thus delicately, yet positively, supported to rock or oscillate upon the knife edges with a minimum of friction, in either direction of movement of such members, under the rotation of the pivots or gudgeons in contact therewith, in varying positions in which the lever 8 may be operated by reason of the load transmitted to the lever from the platform or scale pan. The construction described is further advantageous and beneficial as affording protection against the accumulation of dust and other foreign matter at the supports of members 10 which would have a tendency to detract from the accuracy of the action of the scale mechanism, and is superior to the supporting of a weighted lever from rollers journaled upon ordinary annular bearings that are adapted to accumulate dust and foreign substances, as well as oil, to cause inaccuracy in the scale from time to time.

To produce the best weighing results, the correct relation of the members 10 to the corresponding pivots 9 should be maintained as closely as possible for each weighing operation, and neither of the members 10 should control or vary the operation of another such member. Neither of said members should move from its correct relation to the corresponding pivot 9, and such member should return or be restored to its correct relation to such pivot at the commencement of each weighing operation in case the member may have been displaced from such position by reason of shocks, jars or other causes to which the member may have been subjected. For such purpose I provide means to cause the members 10 to retain or automatically resume their correct positions with respect to the corresponding pivot 9 under all conditions. I, therefore, balance each member 10 with relation to its associate pivot 9 in such manner that said members will be free to rotate under the rotating action of such pivots without imparting resistance thereto, and will automatically resume such correct position in case the member is displaced therefrom by reason of shocks or jars. For such purpose I have shown the members 10 provided with weights 15, supported below the members by means of arms or wires 16 that are shown secured to the outer edges of said members and depend below the same. Said arms are shown bent laterally at their lower parts at 16$^a$ to pass under the corresponding member, and I have shown means whereby the weights 15 are adjustably supported upon said arms. For such purpose said arms may be threaded at 17 to receive corresponding threaded openings in weights 15, whereby said weights may be adjusted along the laterally extending portions 16$^a$ of arms 16 with respect to members 10 to permit desired adjustment of the weights for balancing of the members 10 on their supporting knife edges in the correct or proper positions relatively to the associate pivots 9 when the scale mechanism is at rest.

Figure 2:
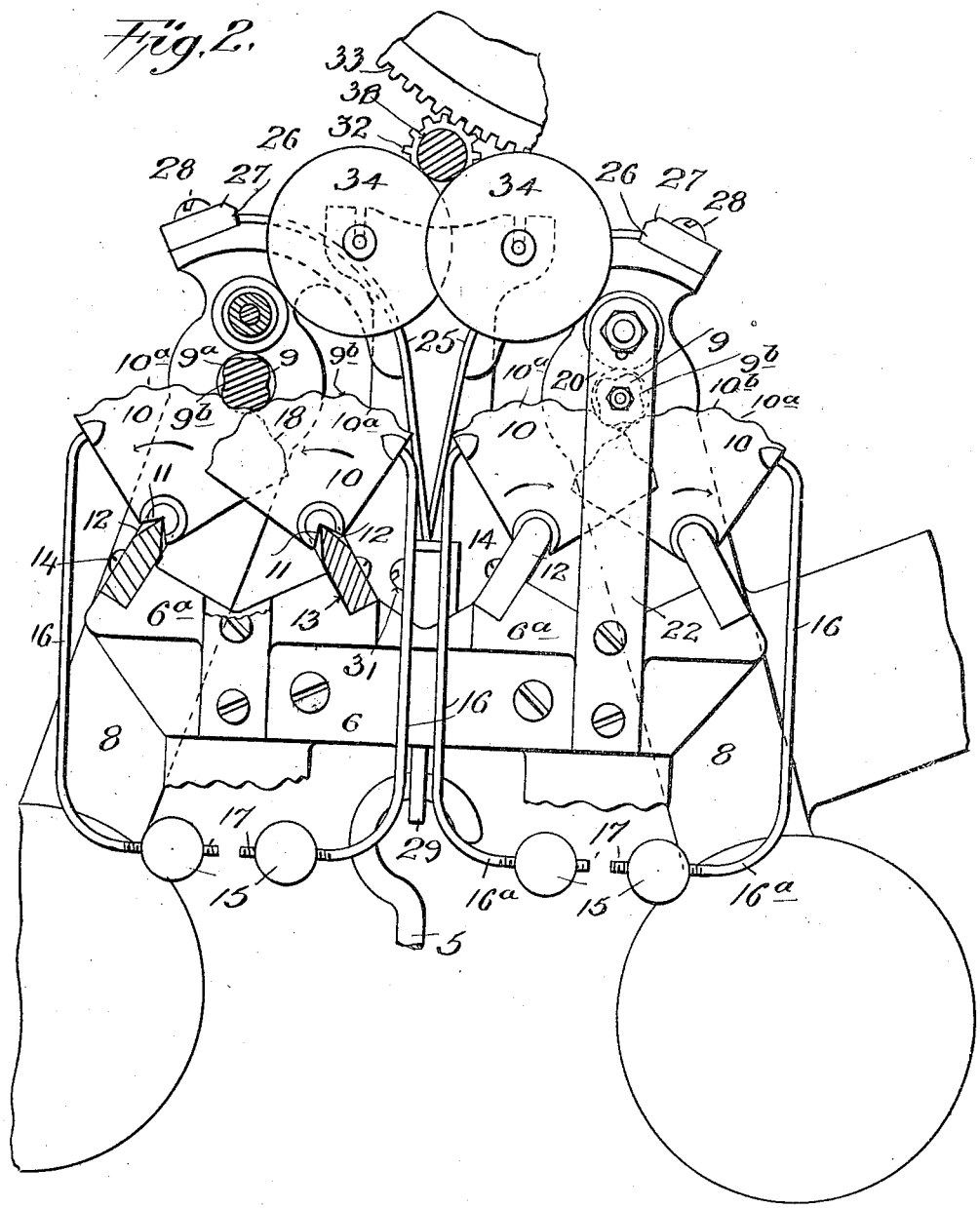
Fig. 2 is an enlarged detail view, partly in section, substantially on the line 2, 2, in Fig. 3.
Figures 3, 4, 5:
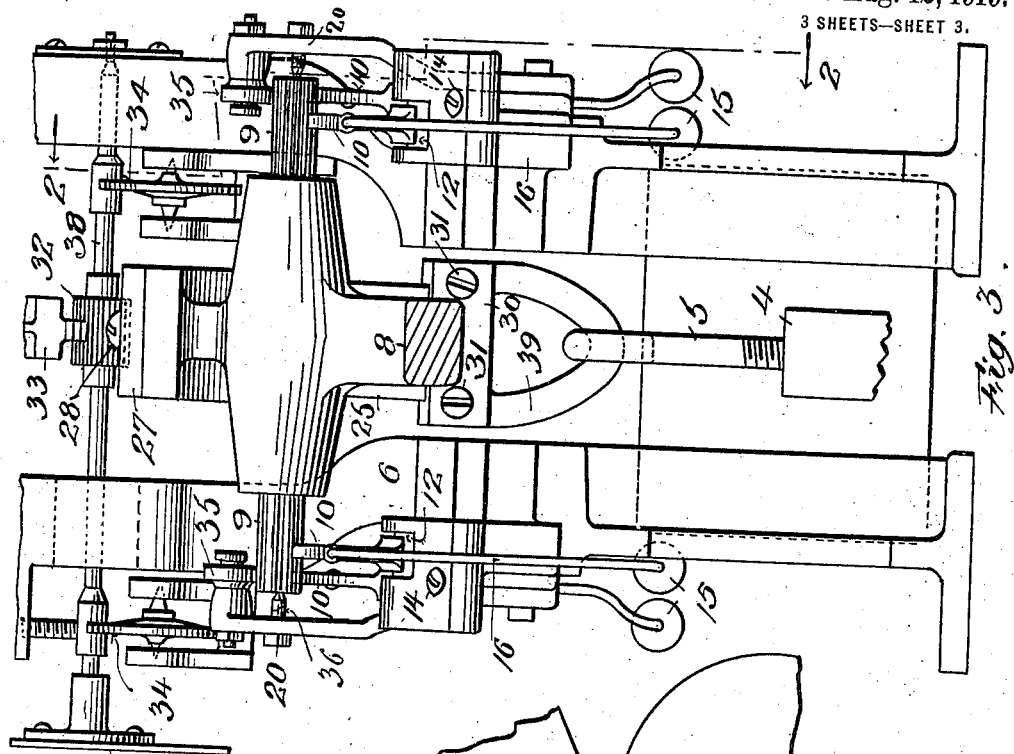
Fig. 3 is an enlarged side view of part of Fig. 1.
Fig. 4 illustrates a modified form of surfaces between pivots 9 and members 10.
Fig. 5 is a detail view.

The opposing working surfaces of the pivots 9 and members 10 may be of any suitable configuration whereby the pivots may move freely on the members. In order, however, to prevent the members 10 from being displaced with relation to the corresponding pivots 9, and to prevent slipping of the contacting surfaces therebetween during rotation of the parts, the working surfaces 10$^a$ of members 10 and the corresponding working surfaces 9$^a$ of pivots 9 may be made in corresponding undulating, wavy or tooth-like form, as indicated at 9$^b$, 10$^b$ (Figs. 1 and 2), whereby, as the pivots 9 rotate, the members 10 will be caused to follow closely the movements thereof, and the members 10 will not be displaced to any considerable extent from their correct or proper positions relatively to pivots 9 at any time. Such an arrangement of coöperating surfaces between pivots 9, and members 10 may be utilized without weights 15, with good results, but may be used with the weights 15, and the latter, by aiding in balancing the members 10 in their different positions, serve to reduce the work of the pivots upon said members as well as to tend to accommodate for any looseness between the coöperating working surfaces of the pivots and members and to cause the more perfect restoration of the members 10 and the pivots to the zero position. Instead of having the coöperating working surfaces between pivots 9 and members 10 in an undulating, wavy or tooth-like form, such surfaces may be smooth, as indicated in Fig. 4, the weights 15, in manner before described, tending to aid in the free movement of members 10 under the pivots 9, and to cause correct positioning of said members.

The lever 8 may be connected with the draft rod by any suitable means to be rocked by reason of the weight on the scale platform or pan. I have illustrated the flexible band 25 connected at 26 by a block 27 and screw 28 with the lever 8, the other end of said band being connected with a loop 29 by means of a block 30 and screws 31, loop 29 being adapted to be connected with hook 5. Where two levers or weighted members 8 are used, as illustrated, in one weighing mechanism, the two bands 25 therefrom may be connected to loop 29 for operation of said levers conjointly. The lever 8 may operate any suitable means for indicating the weight of the article being weighed. I have shown a pointer or indicator 37 carried by a shaft 38 having a pinion 32 in mesh with a rack 33 pivotally supported at 33ª upon riser 6ᵇ from frame 6, which shaft is shown supported upon rollers 34 pivotally supported upon said frame in a well known manner.

Rollers at 35 are shown supported by the uprights 20, that are secured to frame 6, to overlie the pivots 9 to prevent undue rising of the latter. Screws at 36 carried by the uprights 20 limit endwise movement of pivots 9.

The pivots or levers 8 being delicately supported or poised in the manner described, will, when weight is applied to the draft rod, be caused to rotate upon the members 10, and the latter will rock delicately upon their knife edges, and by reason of the balanced members the effort of the pivots to rotate said members will be slight, whereby the operation of the indicator or pointer will not be interfered with by undue resistance of members 10 and said members and the pointer will be accurately returned to and retained at the zero position. If the weights 15 are not used on the members 10 when the latter have the undulating, wavy or tooth-like surfaces coöperating with corresponding surfaces of the pivots 9, yet the members 10 will be caused accurately to return to their correct positions when the pointer or indicator returns to zero. In each instance the accurate return of members 10 to the correct position has the effect of always maintaining the pointer or indicator at zero, thereby overcoming inefficiencies general in many weighing scales with regard to maintaining the pointer or indicator at zero owing to variations and retardations that occur in the weighing mechanism.

Having now described my invention what I claim is:—

1. A measuring instrument comprising a lever having pivots, movable members below and adapted to support said pivots, means movably supporting said members below the pivots, and means to balance said members in correct positions.

2. A measuring instrument comprising a lever having pivots, movable members below and adapted to support said pivots and movable independently of one another, means movably supporting said members below the pivots, and means to balance each of said members to cause it to retain its correct position independently of the other member.

3. A measuring instrument comprising a lever having pivots, movable members below and adapted to support said pivots, means movably supporting said members below the pivots and weights depending from said members to counterbalance them and cause them to retain their correct positions independently of each other and of the pivot thereon.

4. A measuring instrument comprising a lever having pivots, movable members below and adapted to support said pivots, means movably supporting said members below the pivots, and weights depending from the outer sides of and below said members to balance them on their supports independently of each other.

5. A measuring instrument comprising a lever having pivots, movable members below and adapted to support said pivots, means movably supporting said members below the pivots, and weights connected with the outer sides of said members and extending underneath the same to balance them on their supports.

6. A measuring instrument comprising a lever having pivots, movable members below and adapted to support said pivots, means movably supporting said members below the pivots, arms connected to said members and extending transversely thereunder, and weights adjustably supported upon said arms for balancing said members independently of each other.

7. A measuring instrument comprising a lever having pivots, movable members adapted to support said pivots, means movably supporting said members, the coöperating surfaces between said members and pivots being undulating and corresponding to cause the members to follow closely the rotation of the pivots.

8. A measuring instrument comprising a lever having pivots, movable members adapted to support said pivots, means movably supporting said members, the coöperating surfaces between said members and pivots being undulating and corresponding to cause the members to follow closely the rotation of the pivots, and weights connected with said members to balance them in their correct positions.

9. A measuring instrument comprising a lever having pivots, movable members adapted to support said pivots, and means movably supporting said members, said pivots having undulating working surfaces, and pairs of said members being spaced apart under corresponding pivots and having correspondingly undulating working surfaces to coact with said undulating surfaces of the corresponding pivots whereby the members partake closely of the movements of the pivots.

Signed at New York city, in the county of New York and State of New York, this 7th day of February, A. D. 1917.

ERNST J. OHNELL.

Witnesses:
T. F. BOURNE,
MARIE F. WAINRIGHT.

Copies of this patent may be obtained for five cents each, by addressing the "Commissioner of Patents, Washington, D. C."